3,795,637
FIRE-PROOFING AGENTS FOR POLYURETHANES

Joachim Kandler and Franz-Josef Dany, Lechenich, and Klaus Komorniczyk, Turnich, Germany, assignors to Knapsack Aktiengesellschaft, Knapsack, near Cologne, Germany
No Drawing. Continuation-in-part of abandoned application Ser. No. 82,494, Oct. 20, 1970. This application Apr. 26, 1972, Ser. No. 247,725
Claims priority, application Germany, Nov. 10, 1969, P 19 56 406.8
Int. Cl. C08g 22/44, 51/44
U.S. Cl. 260—2.5 AJ     6 Claims

ABSTRACT OF THE DISCLOSURE

Polyurethanes or polyurethane foam plastics are rendered fireproof by means of a blend of fire-proofing agents comprising an ammonium polyphosphate component and a tris-(halogenoalkyl)-phosphate component having from 1 to 4 carbon atoms in the alkyl group. The tris-(halogenoalkyl)-phosphate component preferably is tris-($\beta$-chloroethyl)-phosphate.

---

The present application is a continuation-in-part application of application Ser. No. 82,494, filed Act. 20, 1970, by Kandler et al., now abandoned.

The present invention relates to the use of blends comprising ammonium polyphosphate and tris-(halogenoalkyl) phosphates as fire retarding agents for polyurethanes or polyurethane foam plastics.

The manufacture of flame resistant polyurethanes has been described in German published specification No. 1,283,532, wherein polyhydroxyl compounds of high molecular weight are reacted with polyisocyanates in contact with catalysts and, if desired, in the presence of expanding agents and surface-active substances, and wherein an ammonium polyphosphate of the general formula:

in which $n$ stands for a whole number with an average value higher than 10, $m$ stand stands for a whole number of up to $n+2$, and $m/n$ lies between 0.7 and 1.1, is added as a fire retarding agent to the feed mixture, in a proportion of between 5 and 15 weight percent, based on the feed mixture.

A preferred feature of this known process comprises using a blend of ammonium polyphosphates of the general formula given above with phosphonic acid esters, such as those described in U.S. Pat. 3,076,010, for example bis-($\beta$-chloroethyl)-N,N-dieethanolaminomethyl phosphonate or a similar compound, as the fire retarding agent.

For the fire retarding agents referred to above, it is necessary to be used in relatively large proportions of between about 15 and 20 weight percent, based on the feed mixture prepared for polyurethane formation, to produce a satisfactory fire retarding effect. The use of such large proportions of fire retarding agents has, however, been found to affect the initial physical properties of the polyurethane molding material, for example to reduce its compressive strength, flexural strength and shear strength. The phosphonic acid esters suggested for use in combination with ammonium polyphosphate have failed so far to gain technical interest, in view of their commercially unattractive price.

It is also known that polyurethane foam plastics can be rendered fireproof by the addition of tris-($\beta$-chloroethyl)-phosphate. As reported in U.S. Pat. 3,041,293, the addition of this compound has been found to effect reduction of the plastics' initial compressive strength, upon aging under the influence of moisture.

It is therefore an object of the present invention to provide fire retarding agents for polyurethanes or polyurethane foam plastics, that enable the plastics to be rendered fire proof, without affecting its mechanical properties. A blend comprising ammonium polyphosphate and a tris-(halogenoalkyl)-phosphate has been found suitable for this.

The present invention relates more particularly to the use of a blend of fire retarding agents for fire-proofing polyurethanes of polyurethane foam plastics, the said blend comprising (a) an ammonium polyphosphate component of the general formula:

in which $n$ stands for a whole number with an average value of about 10 to 400, $m$ stands for a whole number of up to $n+2$, $m/n$ lies between about 0.7 and 1.1, and (b) a tris-(halogenoalkyl)-phosphate component having from 1 to 4 carbon atoms in the alkyl group, the (b)-component being preferably tris-($\beta$-chloroethyl)-phosphate.

The tris-(halogenoalkyl)-phosphate and the ammonium polyphosphate are generally used in the blend of fire retarding agents in a ratio by weight of between about 80:20 to 10:90, preferably 30:70, and the blend should conveniently be used in a proportion of between about 5 and 25 weight percent, preferably between about 7 and 10 weight percent, based on the feed mixture prepared for polyurethane formation.

The tris-(halogenalkyl)-phosphates that are used in accordance with the present invention are preferably those in which the halogen is a chlorine or bromine atom.

The polyurethanes that can be rendered fireproof by the incorporation of a blend of fire retarding agents as suggested by the present invention include, for example, those products which are obtained by the reaction of polyhydroxyl compounds of high molecular weight with polyisocyanates in contact with a catalyst and, if desired, in the presence of expanding agents, surface-active substances and further processing auxiliaries. As results therefrom, the polyurethanes also include polyurethane foam plastics.

The useful ammonium polyphosphate-components may be used in any desired particle size which enables them to be made into a blend together with the further constituent of the polyurethane material. Ammonium polyphosphates having a particle size of up to about 100 microns are preferred.

Fireproof polyurethane material is produced by the incorporation of the blend of fire retarding agents of the present invention into the reaction mixture prepared for polyurethane formation. To this end, it is possible to incorporate the blend into one or more of the components forming the reaction mixture, or into the reaction mixture itself. As already mentioned above, such conventional reaction mixture, which is free from fire retarding agents, may consist of a polyhydroxyl compound, a polyisocyanate, one or more catalysts, water, cell regulators, surface-active substances, expanding agents and further processing auxiliaries.

If the reaction of the polyhydroxyl compound and polyisocyanate is catalyzed by means of a tertiary amine, for example, and the fire retarding combination of the present invention blended merely with the amine, then the acid ammonium polyphosphate is found to react with the amine, and the activity of the catalyst is reduced thereby, which is undesirable. It is therefore preferred either to prepare a blend of polyhydroxyl compound, polyisocyanate, catalyst and fire retarding agent, or first to prepare a blend of polyhydroxyl compound and/or polyisocyanate and fire retarding agent, and then combine the blend so made with the catalyst. Sometimes, it may be advantageous to first prepare a blend of polyhydroxyl compound and fire retarding agent and later add thereto all further components which are necessary to produce a rigid polyurethane foam plastics. Finally, it is convenient for the blend of fire retarding agents of the present invention to be neutralized, prior to using it, by means of a substance producing an alkaline reaction, for example ammonia, so as to avoid the possible occurrence of adverse effects upon the catalyst. The blend of fire retarding agents may be used in further combination with conventional fillers, such as heavy spar or chalk, and/or further fire-proofing compounds, which, however, are required to be inert with respect to the present blend of fire retarding agents.

The feed components suitable for use in the manufacture in accordance with the present invention of fireproof polyurethane material include, for example, diols, polyols, polyethers, polyesters or polyester amides which have hydrogen atoms that are capable of reacting with isocyanates. These materials generally have a molecular weight of between about 62 and 5,000 and contain between about 2 and 8 or more hydroxylic groups, per molecule.

The term "polyisocyanates" as used herein also comprises the monomeric di- and polyisocyanates which are known to be suitable for use in the production of polyurethanes. With reference to the polyurethanes, it is also known that they can be produced by means of so-called preliminary addition product methods, wherein the reaction culminating in the formation of polyurethanes is carried out in partial steps. The preliminary addition products which are obtained thereby may also be combined with the blend of fire retarding agents of the present invention, prior to subjecting them to further reaction.

The present blends of fire retarding agents and their use are not limited to a specific type of polyurethane material. They have rather been found to be fully active in all conventional types of polyurethanes.

As results from the working example and table hereinafter, the present blends of fire retarding agents produce an unexpected fire-proofing effect bearing in mind that the blends could not be expected to have an activity excelling that of the individual blend components, for the same concentration in the polyurethane material. Polyurethane material rendered fireproof, for example, by means of a 10 weight percent blend of ammonium polyphosphate and tris-($\beta$-chloroethyl)-phosphate in the mixing ratio of 7:3, was found to be completely incombustible, even after storage under outdoor conditions for 1 year. A control sample treated merely with a 10 weight percent proportion of ammonium polyphosphate was found from the onset to have poorer fireproofness which diminished further after that time. Polyurethane treated merely with tris-($\beta$-chloroethyl)-phosphate was initially incombustible. Upon subjecting it to the burn-up test after storage under outdoor conditions for 1 year, the material was found to merely self-extinguish, after a certain burn-up period.

EXAMPLE

The fireproofness of a rigid polyurethane foam plastics having the composition indicated below was tested in a series of tests. The feed mixture prepared for foaming was blended with various proportions of ammonium polyphosphate (APP), tris-($\beta$-chloroethyl)-phosphate (TCP) and blends of APP and TCP, which were used as the fireproofing agents. In all the tests of the example the ammonium polyphosphate used had the following analysis:

Phosphorus ($P_2O_5$) _____percent__ 71–72
Nitrogen (N) _____do____ 14–15
pH-value (suspension of 1 g./100 g. $H_3O$) _____ 4.5–6
Apparent density _____g./cm.$^3$__ 0.6
Specific weight _____g./cm.$^3$__ 1.8

The feed mixture was composed of:

100 parts by weight of a polyether polyol on a base of a propoxylated glycerol-sugar mixture with a molecular weight of about 300 and a hydroxyl value of about 520 (Caradol 520®; a produce of Duetsche Shell-Chemie GmbH.)
150 parts by weight diphenylmethane-4,4'-diisocyanate
24 parts by weight trichlorofluoromethane
3 parts by weight triethylamine
1 part by weight of a polyglykol-modified polysiloxane (type SF 1066®; a produce of General Electric), and
1 part by weight water.

The quantity of fire-proofing agent added is in weight percent, based on the quantity of the mixture described above.

The fireproofness of the various polyurethane foam plastics was tested in a burn-up test, which was carried out under the burn-up conditions reported in ASTM D–1692–59 T; the results obtained are indicated in the table hereinafter, in which columns A to E have the following meanings:

(A) Linear shrinkage of the polyurethane foam plastics after preparation, in the direction of growth, in percent.

(B) Burn-up length of the polyurethane foam plastics until self-extinction in millimeters, immediately after preparation of the foam plastics.

(C) Burn-up length of the polyurethane foam plastics until self-extinction in millimeters, after storage of the foam plastics under outdoor conditions, for 1 year.

(D) Evaluation (ASTM D–1692–59–T) of the foam plastics subjected to the burn-up test, immediately after preparation.

(E) Evaluation (ASTM D–1692–59–T) of the foam plastics subjected to the burn-up test, after storage under outdoor conditions, for 1 year.

TABLE

| Test No. | Fire-proofing agent | Quantity of fire-proofing agent in weight percent | A, percent | B, mm. | C, mm. | D | E |
|---|---|---|---|---|---|---|---|
| 1 | APP | 5 | <1 | 15 | | Self-extinguishing | |
| 2 | APP | 10 | 2 | 12 | 16 | do | Self-extinguishing. |
| 3 | APP | 15 | 3 | 5 | | do | |
| 4 | TCP | 10 | <1 | <1 | 9 | Nonburning | Do. |
| 5 | TCP | 5 | <1 | | 14 | Self-extinguishing | |
| 6 | APP/TCP 70:30 | 10 | <1 | <1 | <1 | Nonburning | Nonburning. |
| 7 | APP/TCP 70:30 | 7 | <1 | 1 | 1 | do | Do. |
| 8 | APP/TCP 70:30 | 5 | <1 | 5 | | Self-extinguishing | |
| 9 | APP/TCP 90:10 | 10 | 1 | 9 | | do | |
| 10 | APP/TCP 80:20 | 10 | <1 | 5 | 5 | do | Self-extinguishing. |
| 11 | APP/TCP 50:50 | 10 | <1 | <1 | 1 | Nonburning | Nonburning. |
| 12 | APP/TCP 20:80 | 10 | <1 | <1 | 6 | do | Self-extinguishing. |

What is claimed is:

1. Polyurethanes or polyurethane foam plastics rendered fireproof by means of a blend of fireproofing agents comprising: (a) an ammonium polyphosphate component of the general formula $$H_{(n-m)+2}(NH_4)_m P_n O_{3n+1}$$

in which $n$ stands for a whole number with an average value of about 10 to 400, $m$ stands for a whole number of up to $n+2$, and $m/n$ lies between 0.7 and 1.1, and (b) a tris-(halogenoalkyl)-phosphate component having from 1 to 4 carbon atoms in the alkyl group, the blend of fire-proofing agents being in the polyurethane in an amount of between about 7 and 25 weight percent, the percentage being based on the feed mixture prepared for the polyurethane formation, and the tris(halogenoalkyl)phosphate component and ammonium polyphosphate component being used in a ratio by weight of between about 50:50 and 30:70.

2. The polyurethanes as claimed in claim 1, rendered fireproof by means of a blend of fire-proofing agents, of which the (b) component is tris-($\beta$-chloroethyl)-phosphate.

3. The polyurethanes as claimed in claim 1, rendered fireproof by means of a blend of fire-proofing agents, in which the tris-(halogenoalkyl)phosphate component and ammonium polyphosphate component are used in a ratio by weight of about 30:70.

4. The polyurethanes as claimed in claim 1, rendered fireproof by means of between about 7 and 10 weight percent of the blend of fire-proofing agents, the percentage being based on the feed mixture prepared for polyurethane formation.

5. The polyurethanes as claimed in claim 1, obtained by the reaction of polyhydroxyl compounds of high molecular weight with polyisocyanates in contact with a catalyst.

6. The polyurethanes as claimed in claim 1, obtained by the reaction of polyhydroxyl compounds of high molecular weight with polyisocyanates in contact with a catalyst and in the presence of expanding agents, surface-active substances and further processing auxiliaries.

References Cited
UNITED STATES PATENTS

| | | | |
|---|---|---|---|
| 3,681,273 | 8/1972 | Kelly | 260—2.5 AJ |
| 3,423,343 | 1/1969 | Barnett | 260—45.9 W |
| 3,455,850 | 7/1969 | Saunders | 260—2.5 AJ |

HOSEA E. TAYLOR, Primary Examiner

C. W. IVY, Assistant Examiner

U.S. Cl. X.R.

260—45.9 W, 45.9 NP, 77.5 SS, Dig. 24